United States Patent
Wetzel et al.

(10) Patent No.: US 7,421,102 B2
(45) Date of Patent: Sep. 2, 2008

(54) SYSTEM AND METHOD FOR FINDING REGIONS OF INTEREST FOR MICROSCOPIC DIGITAL MONTAGE IMAGING

(75) Inventors: Arthur W. Wetzel, Murrysville, PA (US); John R. Gilbertson, II, Pittsburgh, PA (US); Jeffrey A. Beckstead, Valencia, PA (US); Patricia A. Feineigle, Pittsburgh, PA (US); Christopher R. Hauser, Pittsburgh, PA (US); Frank A. Palmieri, Jr., Gibsonia, PA (US)

(73) Assignee: Carl Zeiss MicroImaging AIS, Inc., Thornwood, NY (US)

( * ) Notice: Subject to any disclaimer, the term of this patent is extended or adjusted under 35 U.S.C. 154(b) by 0 days.

(21) Appl. No.: 11/221,331

(22) Filed: Sep. 6, 2005

(65) Prior Publication Data
US 2006/0029266 A1    Feb. 9, 2006

Related U.S. Application Data

(63) Continuation of application No. 09/758,037, filed on Jan. 11, 2001, now Pat. No. 6,993,169.

(51) Int. Cl.
G06K 9/00    (2006.01)
(52) U.S. Cl. .................. 382/128; 382/274; 348/79
(58) Field of Classification Search .......... 382/128, 382/129, 130, 131, 132, 133, 168, 203, 224, 382/225, 263, 270, 274, 282, 299, 321, 276; 348/79; 435/5; 377/10; 600/476; 378/43
See application file for complete search history.

(56) References Cited

U.S. PATENT DOCUMENTS

| | | | |
|---|---|---|---|
| 3,999,047 A | 12/1976 | Green | |
| 4,136,950 A | 1/1979 | Labrum et al. | |
| 4,150,360 A | * 4/1979 | Kopp et al. ................. | 382/133 |
| 4,199,748 A | 4/1980 | Bacus | |
| 4,213,036 A | 7/1980 | Kopp et al. | |
| 4,523,278 A | 6/1985 | Reinhardt et al. | |
| 4,742,558 A | 5/1988 | Ishibashi et al. | |
| 4,779,151 A | 10/1988 | Lind et al. | |
| 4,965,725 A | 10/1990 | Rutenberg | |
| 5,068,906 A | 11/1991 | Kosaka | |
| 5,072,382 A | 12/1991 | Kamentsky | |
| 5,073,857 A | 12/1991 | Peters et al. | |
| 5,099,521 A | 3/1992 | Kosaka | |
| 5,107,422 A | 4/1992 | Kamentsky et al. | |

(Continued)

FOREIGN PATENT DOCUMENTS

DE    3922358 A1    1/1991

(Continued)

OTHER PUBLICATIONS

Gaddipati et al., "An Efficient Method for Automated Segmentation of Histochemically Stained Slides", IEEE-EMBC and CMBEC (1995).

(Continued)

*Primary Examiner*—Seyed Azarian
(74) *Attorney, Agent, or Firm*—Patterson, Thuente, Skaar & Christensen, P.A.

(57) ABSTRACT

A system for determining tissue locations on a slide.

36 Claims, 4 Drawing Sheets

U.S. PATENT DOCUMENTS

| | | | |
|---|---|---|---|
| 5,123,056 A | 6/1992 | Wilson | |
| 5,143,193 A | 9/1992 | Geraci | |
| 5,149,972 A | 9/1992 | Fay et al. | |
| 5,163,095 A | 11/1992 | Kosaka | |
| 5,216,500 A | 6/1993 | Krummey et al. | |
| 5,216,596 A * | 6/1993 | Weinstein | 348/79 |
| 5,218,645 A | 6/1993 | Bacus | |
| 5,252,487 A | 10/1993 | Bacus et al. | |
| 5,257,182 A | 10/1993 | Luck et al. | |
| 5,260,871 A | 11/1993 | Goldberg | |
| 5,268,966 A | 12/1993 | Kasdan | |
| 5,287,272 A * | 2/1994 | Rutenberg et al. | 382/224 |
| 5,297,034 A | 3/1994 | Weinstein | |
| 5,313,532 A | 5/1994 | Harvey et al. | |
| 5,333,207 A | 7/1994 | Rutenberg | |
| 5,363,258 A | 11/1994 | Coles et al. | |
| 5,381,224 A | 1/1995 | Dixon et al. | |
| 5,417,215 A * | 5/1995 | Evans et al. | 600/442 |
| 5,428,690 A * | 6/1995 | Bacus et al. | 382/128 |
| 5,471,561 A | 11/1995 | Cowgill et al. | |
| 5,473,706 A * | 12/1995 | Bacus et al. | 382/133 |
| 5,499,097 A | 3/1996 | Ortyn et al. | |
| 5,505,946 A | 4/1996 | Kennedy et al. | |
| 5,544,650 A | 8/1996 | Boon et al. | |
| 5,544,996 A | 8/1996 | Castaldi et al. | |
| 5,625,765 A | 4/1997 | Ellenby et al. | |
| 5,636,425 A | 6/1997 | Best | |
| 5,638,459 A | 6/1997 | Rosenlof et al. | |
| 5,647,025 A | 7/1997 | Frost et al. | |
| 5,680,694 A | 10/1997 | Best | |
| 5,687,251 A | 11/1997 | Erler et al. | |
| 5,700,125 A | 12/1997 | Falace et al. | |
| 5,740,270 A | 4/1998 | Rutenberg et al. | |
| 5,768,125 A | 6/1998 | Zinger et al. | |
| 5,784,162 A | 7/1998 | Cabib et al. | |
| 5,796,861 A | 8/1998 | Vogt et al. | |
| 5,835,620 A | 11/1998 | Kaplan et al. | |
| 5,838,837 A | 11/1998 | Hirosawa et al. | |
| 5,848,177 A | 12/1998 | Bauer et al. | |
| 5,878,152 A | 3/1999 | Sussman | |
| 5,912,699 A | 6/1999 | Hayenga et al. | |
| 5,933,519 A | 8/1999 | Lee et al. | |
| 6,014,451 A | 1/2000 | Berry et al. | |
| 6,031,930 A | 2/2000 | Bacus et al. | |
| 6,049,421 A | 4/2000 | Raz et al. | |
| 6,081,612 A | 6/2000 | Gutkowicz-Krusin et al. | |
| 6,091,842 A | 7/2000 | Domanik et al. | |
| 6,101,265 A | 8/2000 | Bacus et al. | |
| 6,151,405 A * | 11/2000 | Douglass et al. | 382/133 |
| 6,172,349 B1 | 1/2001 | Katz et al. | |
| 6,226,392 B1 | 5/2001 | Bacus et al. | |
| 6,233,480 B1 * | 5/2001 | Hochman et al. | 600/476 |
| 6,272,235 B1 * | 8/2001 | Bacus et al. | 382/133 |
| 6,466,690 B2 | 10/2002 | Bacus et al. | |
| 6,498,006 B2 | 12/2002 | Wong | |
| 6,545,265 B1 | 4/2003 | Czarnetzki et al. | |
| 6,711,283 B1 | 3/2004 | Soenksen | |
| 6,920,239 B2 * | 7/2005 | Douglass et al. | 382/128 |

FOREIGN PATENT DOCUMENTS

| | | |
|---|---|---|
| DE | 199 23 821 A1 | 11/2000 |
| EP | 0 557 558 A1 | 9/1993 |
| GB | 1 404 628 | 9/1975 |
| JP | 11097342 | 4/1999 |
| WO | WO 92/13308 | 8/1992 |
| WO | WO 93/14594 | 8/1993 |
| WO | WO 97/04347 | 2/1997 |
| WO | WO 97/20198 | 6/1997 |
| WO | WO 98/39728 | 9/1998 |
| WO | WO 01/37192 | 5/2001 |
| WO | WO 01/61626 | 8/2001 |

OTHER PUBLICATIONS

Wang et al. "Automated Threshold Selection Using Histogram Quantization", Journal of BioMedical Optics, vol. 2, No. 2, (Apr. 1997).

Borga et al., "FSED—Feature Selective Edge Detection", (2000).

Illumea Product Group Internt Page <http://www.illumea.com/800-823-3203/products/>.

Boone et al., "Biomarkers of Premalignant Breast Disease and Thier Use as Surrogate Endpoints in Clinical Trials of Chemopreventive Agents", The Breast Journal, vol. 1, No. 4 (1995).

Kelloff et al., "Development of Breast Cancer Chemopreventive Drugs", Journal of Cellular Biochemistry, 17G:2-13 (1993).

Boone et al. "Developments of Surrogate Endpoint Biomarkers for Clinical Trials of Cancer Chemopreventive Agents:Relationships to Fundamental Properties of Preinvasive (Intraepithelial) Neoplasia", Journal of Cellular Biochemistry, Supplement 19; 10-22 (1994).

Pressman, Norman J., "Markovian Analysis of Cervical Cell Images", The Journal of Histochemistry and Cytochemistry, vol. 24, No. 1, pp. 138-144 (1976).

Bacus et al."Quantiation of Preinvasive Neoplastic Progression in Animal Models of Chemical Carcinogenesis", Journal of Cellular Biochemistry Supplements 28/29:21-38 (1997).

Dawson et al. "Analytical and Quantitative Cycology and Hiscology", Chromatin Texture Measurement by Markovian Analysis.

Russ, John C. "The Image Processing Handbook", 2nd edition.

Dance et al. "Segmenation of Mammograms Using Multiple Linked Self-Organizing Neural Networks", Med. Phys. 22(2) Feb. 1995).

Zhang et al. "Hough Spectrum and Geometric Texture Feature Analysis".

Bacus, James W. "Cervical Celll Recognition and Morphometric Grading by Image Analysis", Journal of Cellular Biochemistry, Supplement 23:33-42(1995).

Pereira et al. "Detection and Characterization of Microcalcification in Mammographic Images".

Weaver B A et al, "Performance of the Ultraheavy Collector of the Trex Experiment" Nuclear Instruments & Methods in Physics Research Section B, Nov. 1998, pp. 409-428, vol. 145, No. 3, Notho-Holland Publishing Company Amsterdam, NL.

Illumea Product Group Internt Page <http://www.illumea.com/800-823-3203/products/> (2000).

Dawson et al. "Analytical and Quantitative Cycology and Hiscology", Chromatin Texture Measurement by Markovian Analysis, (1997).

Russ, John C. "The Image Processing Handbook", 2nd edition, (1995).

Zhang et al. "Hough Spectrum and Geometric Texture Feature Analysis" (1994).

Pereira et al. "Detection and Characterization of Microcalcification in Mammographic Images", (1996).

Silage et al., "Digital Image Tiles: A Method for the Processing of Large Section" *Journal of Microscopy*, vol. 138, Pt. 2, The Royal Microscopical Society, May 1985, pp. 221-227.

* cited by examiner

SYSTEM AND METHOD FOR FINDING REGIONS OF INTEREST FOR MICROSCOPIC DIGITAL MONTAGE IMAGING

CROSS REFERENCE TO RELATED APPLICATIONS

This application is a continuation of U.S. patent application Ser. No. 09/758,037, filed Jan. 11, 2001, now U.S. Pat. No. 6,993,169 which is incorporated herein by reference.

FIELD OF THE INVENTION

The present invention relates to microscopic digital imaging of tissue sections for medical and research use. In particular it describes a method to find regions of interest for high throughput montage imaging of microscope slides using a standard microscope and camera.

BACKGROUND OF THE INVENTION

Laboratories in many biomedical specialties, such as anatomic pathology, hematology, and microbiology, examine tissue under a microscope for the presence and the nature of disease. In recent years, these laboratories have shown a growing interest in microscopic digital imaging as an adjunct to direct visual examination. Digital imaging has a number of advantages including the ability to document disease, share findings, collaborate (as in telemedicine), and analyze morphologic findings by computer. Though numerous studies have shown that digital image quality is acceptable for most clinical and research use, some aspects of microscopic digital imaging are limited in application.

Perhaps the most important limitation to microscopic digital imaging is a "subsampling" problem encountered in all single frame images. The sub-sampling problem has two components: a field of view problem and a resolution-based problem. The field of view problem occurs when an investigator looking at a single frame cannot determine what lies outside the view of an image on a slide. The resolution-based problem occurs when the investigator looking at an image is limited to the resolution of the image. The investigator cannot "zoom in" for a closer examination or "zoom out" for a bird's eye view. Significantly, the field of view and resolution-based problems are inversely related. Thus, as one increases magnification to improve resolution, one decreases the field of view. For example, as a general rule, increasing magnification by a factor of two decreases the field of view by a factor of four.

To get around the limitations of single frame imaging, developers have looked at two general options. The first option takes the general form of "dynamic-robotic" imaging, in which a video camera on the microscope transmits close to real time images to the investigator looking at a monitor, while the investigator operates the microscope by remote control. Though such systems have been used successfully for telepathology, they do not lend themselves to documentation, collaboration, or computer based analysis.

The second option being investigated to overcome the limitations inherit in single frame imaging is a montage (or "virtual slide") approach. In this method, a robotic microscope systematically scans the entire slide, taking an image at every field. The individual images are then "knitted" together in a software application to form a very large data set with very appealing properties. The robotic microscope can span the entire slide area at a resolution limited only by the power of the optical system and camera. Software exists to display this data set at any resolution on a computer screen, allowing the user to zoom in, zoom out, and pan around the data set as if using a physical microscope. The data set can be stored for documentation, shared over the Internet, or analyzed by computer programs.

The "virtual slide" option has some limitations, however. One of the limitations is file size. For an average tissue section, the data generated at 0.33 um/pixel can be between two and five gigabytes uncompressed. In an extreme case, the data generated from one slide can be up to thirty-six gigabytes.

A much more difficult limitation with the prior systems is an image capture time problem. Given an optical primary magnification of twenty and a two-third inch CCD, the system field of view is approximately (8.8 mm.times.6.6 mm)/20=0.44.times.0.33 mm. A standard microscope slide typically has a specimen area of 25 mm.times.50 mm or 12.5 square centimeters. This requires over eighty-six hundred fields to image this entire specimen region. However, the average tissue section for anatomic pathology is approximately 2.25 square centimeters. This only requires approximately fifteen hundred fields to cover the tissue alone, approximately 80 percent less fields.

Traditionally, field rate in montage systems is limited by three factors—camera frame rate, image processing speed, and the rate of slide motion between fields. Given today's technology, the limiting factor can be reduced to only the camera frame rate. Using a 10 frame per second camera for the example above, imaging the entire slide would require 860 seconds or 14.33 minutes. If only the region of interest was imaged, this average time could be reduced to 150 seconds or 2.5 minutes; substantially increasing the slide throughput of an imaging system.

Thus, a system is needed to automatically find the region of interest on a microscope slide and image only this region.

SUMMARY OF THE INVENTION

An embodiment of a tissue finding method disclosed herein includes differentiating tissue containing regions of a microscope slide from non-tissue containing regions of the microscope slide. An embodiment of a tissue finding apparatus disclosed herein includes a device to differentiate tissue containing regions of a microscope slide from non-tissue containing regions of the microscope slide.

The present invention relates to a method and system for processing a thumbnail image from a microscope slide to determine tissue locations on the slide. An embodiment of the system comprises an image cropping component, a tissue finding component, and a scan control component. The image cropping component crops the thumbnail image and removes portions of the image that fall outside of determined slide boundaries. The cropped image from the image cropping component is inputted into the tissue finding component. The tissue finding component identifies tissue regions by applying a sequence of filters that incorporate knowledge of typical appearance and location of tissue and non-tissue slide regions. The tissue finding component outputs a tiling matrix whose values indicate which tiles should be imaged. The scan control component interprets the tiling matrix and transposes positions of the tiling matrix into actual stage coordinate for a microscopic imaging.

Accordingly, it is an object of an embodiment of the invention to provide a microscopic imaging system for whole slide montage in which standard microscope optics, off the shelf cameras and a simple motorized stage can be used to select the region of interest, image only this section and produce aligned image tiles.

An embodiment of the present invention uses a pre-scan process applied to a macroscopic image of the slide, to guide a high-resolution slide scanning process and ensure high-quality images of the entire specimen are acquired. The pre-scan process includes an image cropping component, a tissue-finding component, and a scan control component. The image cropping and tissue finding components identify interesting regions on the slide to be scanned. The scan control component generates the control parameters for a motorized microscopic imaging system.

It is another object of an embodiment of the invention to use a high-resolution slide scanning process to control the operation of the motorized stage and camera. This process utilizes information gathered by the pre-scan process, namely the imaging regions, to control the positioning of the stage to image only the regions of interest and to ensure the individual images are well aligned.

Additional features and advantages of the invention will be set forth in the description that follows, and in part will be apparent from the description, or may be learned by practice of the invention. The objectives and advantages of the invention to be realized and attained by the microscopic image capture system will be pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

DESCRIPTION OF THE PREFERRED EMBODIMENTS

Reference will now be made in detail to the preferred embodiments of the present invention, examples of which are illustrated in the accompanying drawings. The following paragraphs describe the functionality of the inventive system and method for high throughput montage imaging of microscope slides using a standard microscope and cameras.

Figure 1:
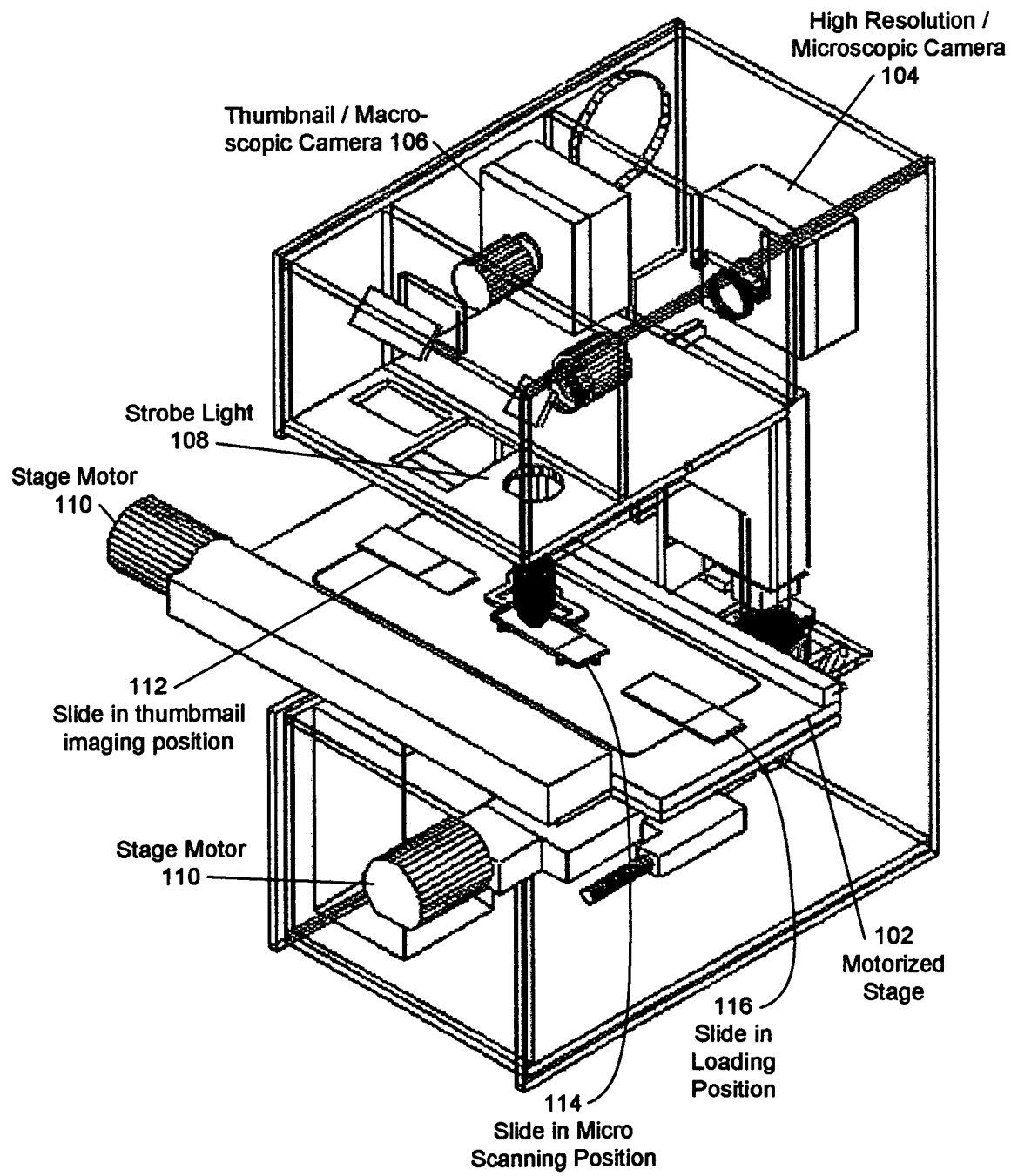
FIG. 1 illustrates an isometric view of the system in an embodiment.

FIG. 1 illustrates an embodiment of the invention. In this embodiment, a slide 112 to be imaged is placed on a thumbnail imaging position in a slide holder on a motorized stage 102. A single frame image containing the entire slide is taken with a macro camera 106. This low-resolution image is analyzed by software components to determine the locations of tissue on slide 112. This information can then be used to generate control parameters for stage 102 and microscopic camera 104 to ensure that the scanning process captures high quality images of only the tissue regions, substantially reducing the time to scan an average slide.

As is obvious to one skilled in the art, although capturing the single macroscopic image saves time, it is not necessary for the operation of the invention. Multiple macroscopic images may be required to generate control parameters to the accuracy required based on the ratio of the macroscopic to microscopic magnifications and the camera specifications of each camera, if separate cameras are utilized.

Specifically in an embodiment, a pre-scan processing of the low-resolution or thumbnail image includes an image cropping component, a tissue-finding component and a scan control component. The image cropping component and tissue finding component identify tissue regions on the slide to be scanned. The scan control component generates the necessary control parameters to scan only the regions of interest under the microscopic optics.

The first step in processing the thumbnail image may consist of flat-field correcting the macroscopic thumbnail image using a similar image obtained from the same camera and a blank slide. This removes any spatial light anomalies from the thumbnail image, which may reduce the efficiency of the tissue-finding component. Given the format, or size, of the camera and the aspect ratio of the slide, a portion of the image will contain non-slide objects such as the slide carrier. To remove these features, the thumbnail image may be cropped to extract only the slide information.

The image cropping may be accomplished via a two-pass process. The first pass determines an approximate location of the slide boundary, and the second pass fine-tunes this estimate. The search for the boundary may be conducted over upper and lower intervals corresponding to the regions expected to contain the upper and lower slide edges, respectively. For this discussion, the slide or region of interest is assumed to be positioned near the center, vertically, in the thumbnail image. To facilitate this and subsequent processing steps, a copy of the thumbnail image may be converted to grayscale. The portion of the image falling outside of the identified slide boundary may be removed. It should be noted that the original color image may also be cropped at the estimated edge locations, and then uniformly reduced in size to produce a small thumbnail image of the slide for rapid, visual slide identification.

Since the slide may not be oriented perfectly horizontal in the original thumbnail image, the identified slide edges are likely to lie at an angle. Thus, even after cropping, there may be remnants of the slide edges or cover slip in the cropped image. Therefore, the image-cropping component attempts to identify pixel blocks that likely contain these remaining edges and flags these blocks as edges that will not be considered for high resolution imaging by the tissue finding component.

The resulting cropped grayscale image generated by the image-cropping component serves as input to the tissue finding component. This component locates regions in the thumbnail image that contain tissue of interest to a specialist. In order to minimize the time and storage space required to accomplish high-resolution slide imaging, the inventive system captures only those regions of the slide that contain tissue. Embodiments of this approach may require that regions containing tissue be identified in the thumbnail image.

The tissue finding component identifies tissue regions via a sequence of filters that incorporate knowledge of the typical appearance and location of tissue and non-tissue slide regions. Initial filtering steps may analyze the mean and standard deviation of the local pixel intensities. Pixel mean intensities may be used to differentiate tissue-containing regions from blank and other non-tissue regions, such as those containing the slide label or other markings. The standard deviation data may represent the amount of variation in pixel values and thus is a good indicator of the border between tissue and the blank slide. The mean and standard deviation data may be combined to generate a threshold value that is used to make an initial classification of tissue versus non-tissue. Subsequently, morphological filters may be applied to refine the classification based on the size and position of neighboring groups of potential tissue pixels.

The filters which comprise the tissue finding component process the pixels of the cropped grayscale thumbnail image in groups that correspond to slide regions, or tiles, that can be imaged individually during the high-resolution scanning process. These filters ensure that tiles only partially filled with tissue are classified as tissue-containing tiles. The final output of the filter sequence is a tiling matrix whose values indicate which tiles should be imaged; the tiling matrix subsequently guides the high-resolution scanning process.

The above description was based on using the mean and standard deviation of the local pixels as the basis for detecting regions of interest. It is obvious to one skilled in the art that other image characteristics can be also used to identify the specimen from non-items of interest such as dust and scratches.

This description was also based on processing a gray scale macroscopic image, the same processing tools can be applied to each of the color components (traditionally, red, green and blue) of a color image. Additional processing tools can also be applied between the color components to refine the tissue finding accuracy and to remove features such as labels and writing that are not critical to the application.

Figure 2:
FIG. 2 represents sample results of the macroscopic image after the cropping component has been applied to remove non-slide regions.
Figure 3:
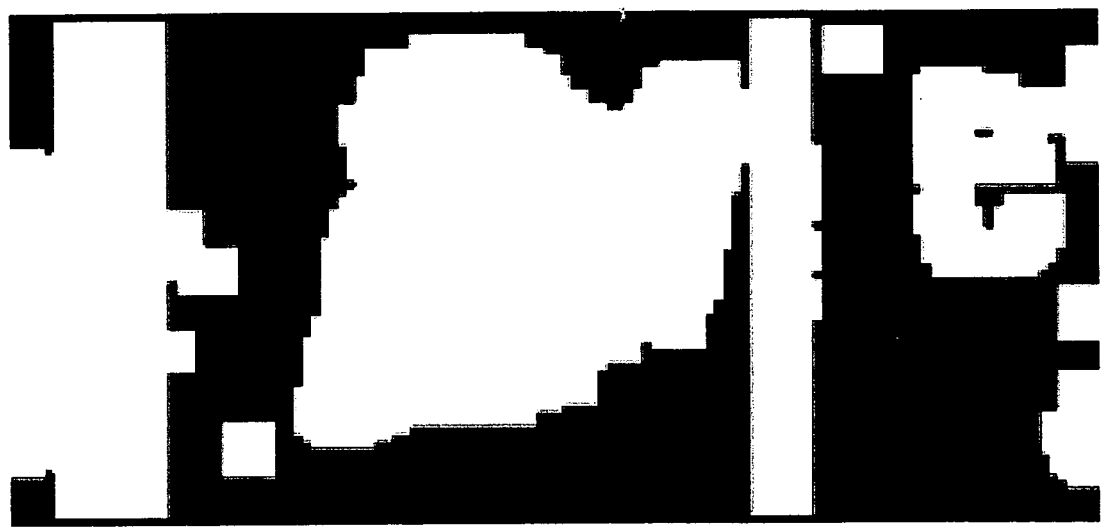
FIG. 3 represents sample results of the find tissue component.
Figure 4:
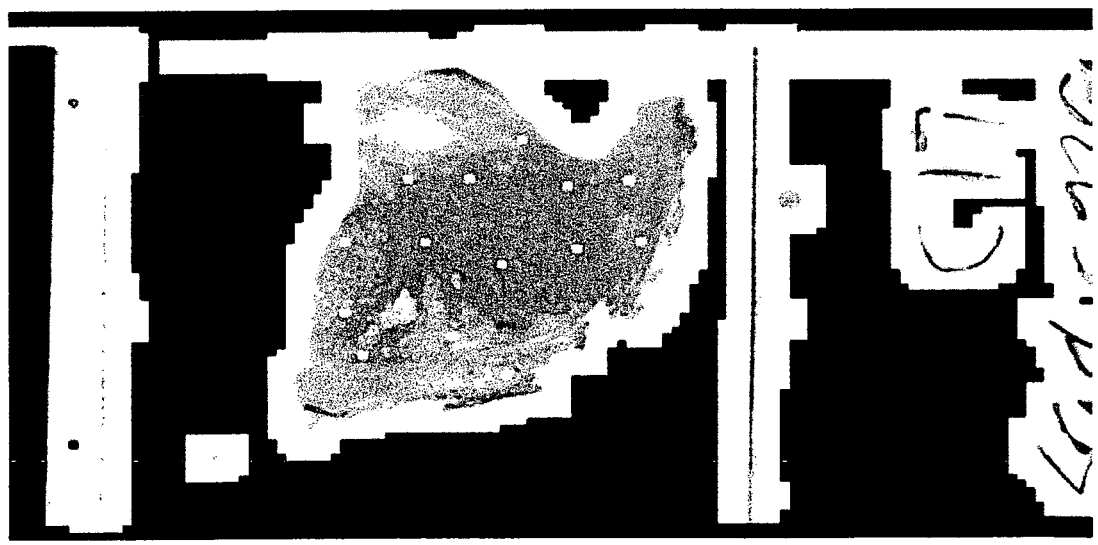
FIG. 4 is an overlay of FIGS. 2 and 3 representing the regions of the slide to be imaged.

An example of the image cropping and find tissue processing is shown in FIGS. 2, 3 and 4. FIG. 2 illustrates the macroscopic image after flat-field correction and image cropping. FIG. 3 illustrates the results of the find tissue component. The resulting tile matrix shown in FIG. 3 has a one-to-one correspondence to the field of view of the microscopic camera. White pixels, which may be associated with a binary 1, may signify fields to be capture and black pixels may represent regions not to image. FIG. 4 illustrates an overlay FIGS. 2 and 3 representing the sections of the slide to be imaged. For this application (anatomical pathology), it may be imperative to image all suspect regions that may contain tissue, so conservative criteria were used in the find tissue component, resulting in cover slip edges and writing etched into the slide to be identified as to be imaged. The savings in the acquisition time is representative by the ratio of the white to black areas of FIG. 3. For this image, only 53% of the slide region is to be imaged, including the label and cover slip edges, and etched writing on the slide.

At the completion of the find tissue component, in this example, the scan control component interprets the find tissue tile matrix (FIG. 3) and transposes the positions into actual stage coordinates for the microscopic imaging. A program running on a host computer controls the operation by communicating with a stage controller and microscopic camera 104. Actual scanning can occur in any fashion such as by rows or columns, or in a step fashion to image neighboring areas.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A system for determining a specimen location on a slide and capturing an image of that location, the system comprising:
    a camera taking a low resolution image of the slide;
    a first component for automatically identifying a region of the low resolution image containing the specimen, where said region defines only a portion of the slide; and
    an image capture component to generate control parameters to control movement of a motorized stage and operation of the camera to capture an image of only the identified region through microscopic optics;
    wherein the low resolution image is inputted into a tissue finding component, and wherein the tissue finding component identifies one or more tissue regions in the low resolution image by applying a filter that incorporates knowledge of typical appearance and location of tissue and non-tissue slide regions and outputs a matrix having values that indicate which slide regions are of interest; and
    wherein the filter converts a copy of the low resolution image to grayscale and analyzes at least one of mean and standard deviation of local pixel intensities in the grayscale image to generate a threshold value for classifying tissue versus non-tissue regions.

2. The system of claim 1, wherein the first components further comprises:
    an image cropping component for determining a location of a slide boundary by searching upper and lower intervals corresponding to boundary regions expected to contain upper and lower edges of the slide and cropping portions of the image falling outside of the determined slide boundary location.

3. The system of claim 2, wherein the low resolution image is a color image and the image cropping component crops the color image at the slide boundary.

4. The system of claim 2, wherein the image cropping component reduces the low resolution image size to produce a small thumbnail image of the specimen for rapid visual identification.

5. The system of claim 2, wherein the image cropping component identifies pixel blocks in the cropped image that are likely to contain remaining slide edge features and flags the blocks as edges that should not be considered for high-resolution imaging.

6. The system of claim 1, wherein the first component includes a tissue finding component that locates regions in the low resolution image that contain tissue of interest.

7. The system of claim 1, wherein the standard deviation represents the amount of variation in pixel intensity and is a good indicator of the border between tissue regions and blank regions of the slide.

8. The system of claim 1, wherein a morphological filters are applied to the matrix to identify slide regions that can be imaged individually during a high-resolution imaging process.

9. The system of claim 8, wherein the morphological filters ensures that tiles that contain both tissue and non-tissue pixels are classified as tissue-containing tiles.

10. The system of claim 1, wherein the low resolution image is taken as a single image.

11. The system of claim 1, wherein the low resolution image is taken as multiple images.

12. The system of claim 1, wherein the first component includes an image capture control component that interprets the identified regions into actual microscope stage coordinates for a microscopic imaging.

13. The system of claim 1, wherein the low resolution image is taken automatically without human intervention, the specimen containing region is identified automatically without human intervention, and the control parameters are generated automatically without human intervention.

14. The system of claim 1, wherein the components are software components executed by a computer.

15. A method for processing a low resolution image from a slide to determine a specimen location on the slide, the method comprising:

cropping the low resolution image to remove portions of the low resolution image that correspond to non-slide objects;

inputting the cropped image into a tissue finding component, wherein the tissue finding component identifies a region containing the specimen by applying a filter that incorporates knowledge of typical appearance and location of specimen and non-specimen slide regions and outputs a matrix whose values indicate which regions of the slide should be imaged;

converting a copy of the low resolution image to a grayscale image and analyzing at least one of mean and standard deviation of local pixel intensities in the grayscale image to generate a threshold value for classifying tissue versus non-tissue regions; and transposing positions of the matrix into actual stage coordinates, and capturing a microscopic image at those stage coordinates.

16. A system for processing a low resolution image from a microscope slide to determine tissue locations on the slide, the system comprising:

a camera taking the low resolution image from the slide;

an image cropping component for cropping non-slide objects from the low resolution image;

a tissue finding component that identifies a region containing a tissue in the low resolution image by applying a sequence of filters that incorporate knowledge of typical appearance and location of tissue and non-tissue slide regions and outputs a matrix whose values indicate which tissue portions of the low resolution image should be imaged;

a scan control component for interpreting the matrix; and a controller, inputting a cropped image from the image cropping component into the tissue finding component and transposing positions of the matrix into actual stage coordinates for microscopic imaging;

wherein the low resolution image is inputted into a tissue finding component, and wherein the tissue finding component identifies one or more tissue regions in the low resolution image by applying a filter that incorporates knowledge of typical appearance and location of tissue and non-tissue slide regions and outputs a matrix having values that indicate which slide regions are of interest; and wherein the filter converts a copy of the low resolution image to grayscale and analyzes at least one of mean and standard deviation of local pixel intensities in the grayscale image to generate a threshold value for classifying tissue versus non-tissue regions.

17. A tissue finding method, for differentiating tissue containing regions of a microscope slide from non-tissue containing regions of the microscope slide, comprising:

Taking a low resolution image of the slide;

automatically identifying a region of the low resolution image containing the specimen, where said region defines only a portion of the slide;

generating control parameters to control movement of a motorized stage and operation of the camera to capture an image of only the identified region through microscopic optics;

inputting the low resolution image into a tissue finding component, and identifying one or more tissue regions in the low resolution image by applying a filter that incorporates knowledge of typical appearance and location of tissue and non-tissue slide regions and outputs a matrix having values that indicate which slide regions are of interest; and converting a copy of the low resolution image to grayscale and analyzing at least one of mean and standard deviation of local pixel intensities in the grayscale image to generate a threshold value for classifying tissue versus non-tissue regions.

18. The tissue finding method of claim 17, further comprising capturing a magnified image of each tissue containing region.

19. The tissue finding method of claim 17, further comprising:

capturing an image of at least a portion of the microscope slide; and grouping pixels of the captured image into regions.

20. The tissue finding method of claim 17, wherein regions only partially filled with tissue are classified as tissue containing.

21. The tissue finding method of claim 17, further comprising providing a tiling matrix having values that indicate which regions should be imaged.

22. The tissue finding method of claim 21, further comprising transposing the tiling matrix into coordinates of an image to be captured.

23. A tissue finding apparatus that is to group pixels comprising an image of a microscope slide into regions and differentiate the regions that contain at least a portion of an image of a tissue from the regions that do not contain at least a portion of an image of a tissue;

wherein a low resolution image is inputted into the tissue finding apparatus, and wherein the tissue finding apparatus identifies one or more tissue regions in the low resolution image by applying a filter that incorporates knowledge of typical appearance and location of tissue and non-tissue slide regions and outputs a matrix having values that indicate which slide regions are of interest; and wherein the filter converts a copy of the low resolution image to grayscale and analyzes at least one of mean and standard deviation of local pixel intensities in the grayscale image to generate a threshold value for classifying tissue versus non-tissue regions.

24. The tissue finding apparatus of claim 23, further comprising:

a stage on which the microscope slide is to be placed;

a microscopic optic directed toward the stage; and a camera directed toward the stage and coupled to the tissue finding apparatus.

25. The tissue finding apparatus of claim 24, wherein the camera is to capture an image of at least a portion of the microscope slide and the tissue finding apparatus is further to capture an image of each region containing at least a portion of an image of a tissue using the camera directed through the microscopic optic.

26. The tissue finding apparatus of claim 23, wherein the tissue finding apparatus is to differentiate tissue containing regions of the microscope slide from non-tissue containing regions of the microscope slide based, at least in part, on the typical appearance of tissue and non-tissue regions.

27. The tissue finding apparatus of claim 23, wherein the tissue finding apparatus is to differentiate tissue containing regions of the microscope slide from non-tissue containing regions of the microscope slide based, at least in part, on the typical location of tissue and non-tissue regions.

28. The tissue finding apparatus of claim 23, wherein the tissue finding apparatus is further to provide a tiling matrix having values that indicate which regions should be imaged.

29. The tissue finding apparatus of claim 28, wherein the tissue finding apparatus is further to transpose the tiling matrix into coordinates of an image to be captured.

30. A tissue finding apparatus that is to differentiate tissue containing regions of a microscope slide from non-tissue containing regions of the microscope slide wherein a low resolution image is inputted into the tissue finding apparatus, and wherein the tissue finding apparatus identifies one or more tissue regions in the low resolution image by applying a filter that incorporates knowledge of typical appearance and location of tissue and non-tissue slide regions and outputs a matrix having values that indicate which slide regions are of interest; and wherein the filter converts a copy of the low resolution image to grayscale and analyzes at least one of mean and standard deviation of local pixel intensities in the grayscale image to generate a threshold value for classifying tissue versus non-tissue regions.

31. The tissue finding apparatus of claim 30, further comprising:

a stage on which the microscope slide is to be placed;
a microscopic optic directed toward the stage; and
a camera directed toward the stage and coupled to the tissue finding apparatus.

32. The tissue finding apparatus of claim 31, wherein the camera is to capture an image of at least a portion of the microscope slide and the tissue finding apparatus is further to capture an image of each region containing at least a portion of an image of a tissue using the camera directed through the microscopic optic.

33. The tissue finding apparatus of claim 30, wherein the tissue finding apparatus is further to differentiate tissue containing regions of the microscope slide from non-tissue containing regions of the microscope slide based, at least in part, on the typical appearance of tissue and non-tissue regions.

34. The tissue finding apparatus of claim 30, wherein the tissue finding apparatus is further to differentiate tissue containing regions of the microscopic slide from non-tissue containing regions of the microscope slide based, at least in part, on the typical location of tissue and non-tissue regions.

35. The tissue finding apparatus of claim 30, wherein the tissue finding apparatus is further to provide a tiling matrix having values that indicate which regions should be imaged.

36. The tissue finding apparatus of claim 35, wherein the tissue finding apparatus is further to transpose the tiling matrix into coordinates of an image to be captured.

* * * * *